United States Patent [19]

Strepparola et al.

[11] Patent Number: 5,000,864
[45] Date of Patent: Mar. 19, 1991

[54] PERFLUOROPOLYETHERS HAVING ANTIRUST PROPERTIES, USEFUL AS COMPONENTS OR ADDITIVES FOR LUBRICATING OILS AND GREASES

[75] Inventors: Ezio Strepparola, Treviglio; Costante Corti, Milan; Piero Gavezotti, Milan; Alba Chittofrati, Milan, all of Italy

[73] Assignee: Ausimont S.R.L., Milan, Italy

[21] Appl. No.: 476,754

[22] Filed: Feb. 8, 1990

[30] Foreign Application Priority Data

Feb. 9, 1989 [IT] Italy ............................. 19372 A/89

[51] Int. Cl.$^5$ ............................................. C10M 147/04
[52] U.S. Cl. ............................ 252/51.5 A; 252/51; 252/51.5 R; 252/54; 252/54.6; 252/56 R; 252/392; 252/396; 568/614; 568/615
[58] Field of Search .................. 568/614, 615; 252/54, 252/54.6, 51.5 R, 51.5 A

[56] References Cited

U.S. PATENT DOCUMENTS

| 3,665,041 | 5/1972 | Sianesi et al. | 568/416 |
| 3,683,027 | 8/1972 | Sianesi et al. | 568/416 |
| 3,810,874 | 5/1974 | Mitsch et al. | 560/223 |
| 3,847,978 | 11/1974 | Sianesi et al. | 568/416 |
| 4,788,257 | 11/1988 | Caporiccio et al. | 568/615 |
| 4,814,372 | 3/1989 | Caporiccio et al. | 568/615 |
| 4,889,939 | 12/1989 | Caporiccio et al. | 568/615 |

FOREIGN PATENT DOCUMENTS 340739 2/1989 European Pat. Off. .
1244189 8/1971 United Kingdom .

*Primary Examiner*—Olik Chaudhuri
*Assistant Examiner*—E. McAvoy
*Attorney, Agent, or Firm*—Morgan & Finnegan

[57] ABSTRACT

Perfluoropolyethers having antirust properties, suitable for being used as lubricating oils or as components of lubricating greases or as antirust additives for lubricating oils and greases based on perfluoropolyethers.

11 Claims, No Drawings

PERFLUOROPOLYETHERS HAVING ANTIRUST PROPERTIES, USEFUL AS COMPONENTS OR ADDITIVES FOR LUBRICATING OILS AND GREASES

DESCRIPTION OF THE INVENTION

The present invention relates to functionalized fluoropolyethereal compounds having antirust properties.

It is known that the use of perfluoropolyethers as lubricants cannot prevent the formation of rust on the surface of iron materials even if these are coated by an oil film, when in the presence of moisture.

The reason is to be attributed to the high permeability of perfluoropolyethers (PFPE) to gases, to vapors and, among these, also to steam.

PFPE, which are utilizable for formulating lubricating oils and greases are broadly known on the market such as, for example : FOMBLIN® (Montedison), KRYTOX® (Du Pont), DEMNUM® (Daikin), etc.

They are in particular perfluoropolyethers (PFPE) of the "neutral" type, i.e. having perfluoroalkyl end groups, and liquid with a very low vapor tension and with a viscosity generally ranging from 10 to 4,000 Cst at 20° C.

As an example, the following classes of perfluoropolyethers can be cited :

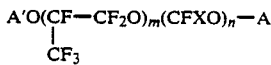   (1)

wherein X is —F, —CF ; A and A', like or unlike each other, can be —CF$_3$, C$_2$F$_5$, C$_3$F$_7$, units (CF(CF$_3$)CF$_2$O) and CFXO are random distributed along the perfluoropolyethereal chain, m and n are integers such that the viscosity ranges from 10 to 4,000 Cst.

These perfluoropolyethers are prepared by photooxidation reaction of hexafluoropropene according to the process described in U.K. patent No. 1,104,482, and by subsequent conversion of the end groups into inert groups according to the process described in U.K. patent No. 1,226,566.

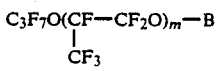   (2)

wherein B can be —C$_2$F$_5$, —C$_3$F$_7$, and m is a positive integer such that the product viscosity is in the abovesaid range. These compounds are prepared by ionic oligomerization of the hexafluoropropene epoxide and by subsequent treatment of acyl fluoride (COF) with fluorine according to the processes illustrated in U.S. Pat. No. 2,242,218.

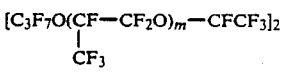   (3)

wherein m is an integer such that the product viscosity is in the above-considered range.

These products are prepared by ionic telomerization of the hexafluoropropene epoxide and by subsequent photochemical dimerization of acyl fluoride, according to the processes described in U.S. Pat. No. 3,214,478.

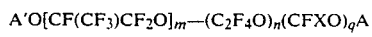   (4)

wherein A and A', like or unlike each other, can be —CF$_3$, —C$_2$F$_5$, —C$_3$F$_7$; X is —F, —CF$_3$; m, n and q are integers and can also be equal to 0, but in any case are such that the viscosity may be in the abovesaid range.

These products are obtained by photooxidation of mixtures of C$_3$F$_6$ and C$_2$F$_4$ and by subsequent treatment with fluorine according to the process described in U.S. Pat. No. 3,665,041.

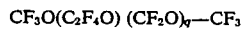   (5)

wherein p and q are integers like or unlike each other, wherein the p/q ratio ranges from 0.5 to 2 and is such that the viscosity is in the above-indicated range. These perfluoropolyethers are prepared by photochemical oxidation of C$_2$F$_4$ according to U.S. Pat. No. 3,715,378; subsequently, the photooxidation product is treated with fluorine according to U.S. Pat. No. 3,665,041.

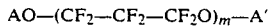   (6)

wherein A and A', like or unlike each other, can be —CF$_3$, —C$_2$F$_5$, —C$_3$F$_7$, and m is an integer such that the viscosity of the product is in the above-indicated range of values.

These products are prepared according to European patent No. EP 148,482.

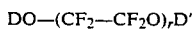   (7)

wherein D and D', like or unlike each other, can be —CF$_3$, —C$_2$F$_5$, and r is an integer such that the viscosity of the products is in the above-indicated range of values. These products are obtained according to U.S. Pat. No. 4,523,039.

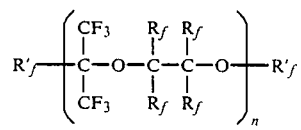   (8)

wherein R'$_f$ is a perfluoroalkyl, n is at least 8, R$_f$ is F or a perfluoroalkyl. These perfluoropolyethers are described in PCT patent application WD 87/00538.

It is known that it is extremely difficult to addition perfluoropolyethers as a characteristic thereof is the absolute immiscibility with most of the chemical compounds, wherefore it is impossible to use, as additives, the products which usually are utilized for the mineral oils customarily used as lubricants and easy to be additioned, with formation of mixtures endowed with a sufficient stability in the time.

The compounds according to the invention, exhibit a considerable improvement as regards antirust protection with respect to the products having an anti-corrosive action, cited in European patent applications Nos. 95,825, 165,649, 165,650 and in Italian patent No. 1189469.

In particular, the additives described in Italian patent No. 1189469, which have exhibited best antirust properties are the following :

1. 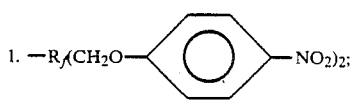

2. 

3. 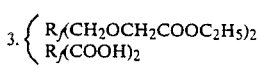

wherein $R_f$=—$CF_2R'_fCF_2$, with $R'$ being a perfluoropolyethereal chain having an average molecular weight equal to 2,000.

However, additives 1 and 3 indicated hereinbefore are affected with the drawback of being little soluble in the lubricating perfluoropolyether, giving rise to problems as concerns the phase separation, while additive 2, in spite of being endowed, at the beginning, with an acceptable solubility, gives rise, in the course of time, to a certain amount of the corresponding ester, which renders the mass turbid and tends to form a supernatant layer, wherefore the additive separates from the lubricant.

Also other products of the class of perfluoropolyethers having, as end groups, nitrile, amine groups, nitrogenous heterocyclic groups, optionally combined with low amounts of perfluoropolyethereal acids, have been proposed: such antirust additives exhibit a rather good solubility in perfluoropolyethereal oils (see European patent application No. EP-337425).

It has now surprisingly been found that the perfluoropolyether, prepared by photochemical oxidation of perfluoropropene, optionally in admixture with $C_2F_4$ and optionally in the presence of a chlorofluoroolefin, by successive heat treatment of the peroxy product in order to remove the peroxidicgroups present therein, and by following hydrolysis treatment in order to convert the —COF groups into —COOH groups, can be advantageously utilized without any further treatment for the conversion of the ketonic end groups, in view of its antirust properties, both as an additive for perfluoropolyethereal lubricating oils, and as a component of lubricating greases or as a lubricating oil per se.

In fact, it has surprisingly been observed that the presence of ketonic end groups results in improved antirust properties as compared with perfluoropolyethers having the same structure and in which said ketonic groups have been converted, by treatment with alkalis, into carboxylic groups or —$CF_2H$ groups.

The product having antirust properties, according to the present invention consists of a mixture of macromolecules characterized by a perfluoropolyethereal chain having the following structure:

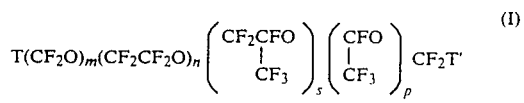 (I)

wherein the perfluorooxyalkylene units with indexes m, n, s, p are random distributed along the chain, the values of m, n, s, p being such that the average molecular weight ranges from 2,500 to 20,000, index n being 0 when only $C_3F_6$ is used as the starting fluorinated olefin, end groups T and T', like or unlike each other a comprised in the following group: $CF_2XO$—, $C_2F_4XO$—, $C_3F_6XO$—, —COOH, —$CONR_1R_2$, —$COO^-.HA^+$(-carboxylic group salified with an amine $R_1R_2HN$),

and its hydroxylated derivative

wherein X is F or Cl, $R_1$ and $R_2$ are H or alkyl, cycloalkyl, alkylaryl, aryl radicals, optionally containing substituents such as, e.g., —OH, halogens, or N belongs to a heterocyclic radical which may contain also other heteroatoms such as O, S, and P. Each macromolecule has at least one functional end group and, more commonly, it has only one functional end group.

In the perfluoropolyethereal product having antirust properties according to the present invention, amidic group —$CONR_1R_2$ and salified carboxylic group —$COO^-.HA^+$ may be alternative to free carboxylic group —COOH. The carboxylic group can be converted into the corresponding amidic group, or it can be salified in whole or in part with amine.

The macromolecule mixture to be used as an antirust agent according to the present invention is furthermore characterized by a content of ketonic groups

and hydrates thereof, and of carboxylic groups —COOH, or their amidic equivalents —$CONR_1R_2$ or salified carboxylic equivalents —$COO^-.HA^+$, in defined ratios ranging from 0.5 to 5 expressed as CO/—COZ, wherein —COZ is the sum of —COOH, —$CONR_1R_2$ and —$COO^-.HA^+$.

The number of end groups —COZ is such that the average value of the milliequivalents of —COZ per gram of product ranges from 0.005 to 0.25 and preferably is at least 0.05.

The perfluoropolyethers having antirust properties according to the present invention can be used as additives for the "neutral" perfluoropolyethers (PFPE), i.e. perfluoropolyethers having perfluoroalkyl end groups of the above-indicated classes 1–8, in amounts equal to at least 3% by weight and preferably to at least 5% by weight.

In consideration of their full mixability with neutral PFPE and of the fact that they can be used as lubricants per se, the perfluoropolyethers according to the invention can be used, of course, also in a proportion up to 100%.

The perfluoropolyethers having antirust properties according to the invention can be used either as such or in admixture with neutral PFPE, in the preparation of lubricating greases having antirust properties.

In particular, said lubricating greases are prepared in the form of a suspension of powdered polytetrafluoroethylene in liquid perfluoropolyether, according to what is disclosed in European patent application 95,825.

The perfluoropolyethers having general formula (1) can be prepared by means of the processes disclosed in patents: USP Nos. 3,665,041, 3,683,027, 3,847,978, GB No. 1,244,189, optionally operating in the presence of chlorofluoroolefin according to European patent application No. EP-340 739 in the name of the Applicant.

The carboxylic and amidic end groups can be introduced according to the methods described in the abovesaid patents or in U.S. Pat. No. 3,810,874.

The salification of the free carboxylic groups of their conversion into amidic groups by means of amines can be partial or total. It is possible also to use an excess of amine with respect to the stoichiometric amount (up to 2.5 moles of amine for each —COOH group).

In particular, the following amines are utilizable: morpholine, triethanolamine, isobutylamine, N-aminoethylethanolamine.

The antirust properties of the lubricants according to the invention have been evaluated through the following tests.

Antirust test in fog chamber (internal method modified ASTM B 117)

Object

Determination of the antirust properties of oils on metals in high moisture conditions.

Summary of the method

Little plates of carbon steel (Cl5) (UNI)—superficially treated as described hereinafter—are immerged into the oil, allowed to drip and hung in a fog chamber at 35° C., 100% of relative humidity, for a pre-established number of hours. The oil passes or does not pass the test depending on the rust stains which are visible on the surface of the plates.

Apparatus

The fog chamber consists of a sprayer operating by means of compressed air (pressure=2.5 atm.), connected with a water tank and capable of saturating the environment with moisture; the temperature control is adjusted at 35° C.

Test conditions

The tests reported herein were carried out using partially demineralized water (pH=5.5-7.5) and operating as follows:
1. the plates were hung and allowed to drip for 16 hours;
2. they were then introduced into the fog chamber, which was maintained switched on during the pre-established duration of the test (16 hours; 32 hours; 96 hours).

The evaluation was then carried out.

Preparation of the steel plates

The little steel plates were cleaned and degreased by means of a pad which is first imbued with n-hexane and then with Delifrene 113 (trichlorotrifluoroethane). The dimensions of the utilized plates were 50×100×3 mm. (Note: to handle the plates, polyethylene guantlets are used).

Evaluation of the tests (in analogy with method DIN 51802 (EMCOR) for bearings).

The results of the tests are expressed according to the following classification:

(a) — no trace of rust is observed (0);
(b) — very few corrosion spots having diameter below 1 mm (1);
(c) — 30% of the surface is covered with little spots having diameter below 2 mm (2);
(d) — 60% of the surface is covered with little spots having diameter below 3 mm (3);
(e) — 100% of the surface is covered with large spots having diameter of 4–5 mm, with the bright surface being visible in a few points (4);
(f) — 100% of the surface is covered with large stains; the underlying surface is not visible (5);

The evaluation does not consider the rust stains appearing in the area located up to 0.5 mm from the edges. When the evaluation is (0), the result is to be considered as optimum; also evaluation (1) is acceptable. In the evaluation, two numbers are indicated: the first one relates to the state of the exposed surface, the second one to the state of the non-exposed surface (with respect to the sprayer).

EXAMPLES

The following examples are given to illustrate but not to limit the present invention.

EXAMPLE 1

By means of the accelerated corrosion test in the fog chamber, according to the method described hereinabove, and for a time of 16 hours, the antirust property was tested of a perfluoropolyether belonging to formula (I), wherein "n" is zero and having an average molecular weight of 2600 about, and with acid end groups —CCOH in an amount equal to an average acid equivalent weight of 9,800 (equal to about 0.1 m. equivalents of —COOH/g) and with a CO/—COZ ratio equal to 2.8. The product was tested both as such and in admixture with a perfluoropolyether having perfluoroalkyl end groups of class (1), having a viscosity of about 250 cSt at 20° C. and an average molecular weight equal to 3,200 (product Fomblin Y 25 ® produced by Montedison).

Table 1 shows the results obtained both with the antirust product as such (100%) and by using it at different % in the neutral PFPE. The Table shows also the concentration of end groups —COOH in the mixture with neutral PFPE.

TABLE 1

| Acid PFPE % by wg | m.eq. of COOH/g | Antirust index |
| --- | --- | --- |
| (a) 100 | about 0.1 | 0-0 |
| (b) 1 | about 0.001 | 3-2 |
| (c) 3 | about 0.003 | 2-1 |
| (d) 5 | about 0.005 | 1-0 |

EXAMPLE 1A (comparative test)

A perfluoropolyether having acid end groups, like the one utilized in the preceding example 1, was subjected to saponification with KOH in order to remove a part of ketonic end groups

The resulting perfluoropolyether was therefore corresponding to the one of example 1 as regards the acid equivalent weight, with the difference that it exhibited a CO/COZ ratio of about 0.1.

The product used as an additive for the same neutral oil Fomblin of example 1 gave, in the corrosion test and under the same conditions as in example 1, much worse results than the ones obtained with the functionalized perfluoropolyether according to the invention, having a CO/COZ ratio equal to 2.8, as results from the data reported in the following Table 2 in comparison with the ones of tests b), c), d) of Table 1.

TABLE 2

| Acid PFPE | m.eq. of COOH/g | Antirust index |
| --- | --- | --- |
| (1) 1% b.wg. | 0.001 | 4–3 |
| (2) 3% b.wg. | 0.003 | 3–2 |
| (3) 5% b.wg. | 0.005 | 2–2 |

EXAMPLE 1B

Test (a) of example 1 was repeated for a 96-hour time. The result of the test was again 0—0.

EXAMPLE 1C

Example 1 was repeated using, as a lubricant, perfluoropolyether Fomblin Y 25 as such, not additioned.

The result was a complete corrosion of the plate; evaluation : 5—5.

EXAMPLE 2

A sample of perfluoropolyether belonging to formula (I), wherein "n" is zero and having an average molecular weight of 3300 about, and with acid groups salified with morpholine or isobutylamine was subjected to the accelerated corrosion test as in example 1. The average acid equivalent weight was 5,000 equal to 0.2 m.eq. of COZ/g. The CO/COZ ratio was equal to 0.5.

Also mixtures of the same perfluoropolyether with the PFPE having perfluoroalkyl end groups of example 1 (Fomblin Y 25) were examined.

The results are reported in the following Table 3, wherein also the amine amount utilized in the salification is indicated.

TABLE 3

| Acid PFPE (salified) % by wg. | m.eq. of COZ/g | eq. of amine / eq. of COZ | Amine | Antirust index |
| --- | --- | --- | --- | --- |
| (a) 1 | 0.002 | 1.5 | M | 3-2 |
| (b) 3 | 0.006 | 1.5 | M | 2-2 |
| (c) 5 | 0.01 | 1.5 | M | 1-0 |
| (d) 100 | 0.2 | 1 | IBA | 0-0 |
| (e) 100 | 0.2 | 1 | M | 0-0 |
| (f) 100 | 0.2 | 1.5 | M | 0-0 |

M = morpholine
IBA = isobutylamine

EXAMPLE 2A

Tests (d), (e), (f) of example 2 were repeated for a 32-hour time.

The results of the tests were 2—0, 1—0, 1—0, respectively.

EXAMPLE 3

Samples of perfluoropolyether having perfluoroalkyl end groups Fomblin Y 25 added with a perfluoropolyether belonging to formula (I), wherein "n" is zero and having an average molecular weight of 2500 about, and containing carboxylic end groups salified with triethanolamine (average acid equivalent weight 9,000 equal to a content of 0.11 m.eq./g of end groups —COZ, CO/COZ ratio equal to 2.6) were examined by means of the accelerated corrosion test according to example 1.

The results are reported in Table 4.

TABLE 4

| Acid PFPE (salified) % by wg. | m.eq. of COZ/g | eq. of amine / eq. of COZ | Antirust index |
| --- | --- | --- | --- |
| (a) 2.75 | 0.003 | 2.5 | 2-0 |
| (b) 5.5 | 0.006 | 2.5 | 1-0 |
| (c) 10 | 0.011 | 2.5 | 1-0 |

EXAMPLE 3A

Tests (b), (c) of example 3 were repeated for a 96-hour time.

The results of the tests were 1—0, 1—0, respectively.

EXAMPLE 4

Samples of PFPE having perfluoroalkyl end groups Fomblin Y 25 added with a perfluoropolyether belonging to formula (I), wherein "n" is zero and having an average molecular weight of 2500 about, and with acid end groups converted into the amide group deriving from N(2-aminoethyl)ethanolamine (average acid equivalent weight of the starting PFPE 9,000 equal to 0.11 m.eq. of acid/g, CO/COZ ratio equal to 2.6) were examined by means of the accelerated corrosion test as in example 1.

The results are reported in Table 5, wherein also the utilized amine amount is indicated.

TABLE 5

| Acid PFPE (amide) % by wg. | m.eq. of COZ/g | eq. of amine / eq. of COZ | Antirust index |
| --- | --- | --- | --- |
| (a) 3 | 0.003 | 2.4 | 1-0 |
| (b) 5.4 | 0.006 | 2.5 | 1-0 |
| (c) 10.6 | 0.012 | 2.5 | 0-0 |

EXAMPLE 4A

Tests (b), (c) of example 4 were repeated for a 32-hour time.

The results of the tests were 2-0, 0-0, respectively.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A method using perfluoropolyethers having antirust properties as lubricating oils or as antirust additives for perfluoropolyethereal lubricating oils, prepared by photochemical oxidation of $CF_2=CFCF_3$ or of mixtures of $CF_2=CFCF_3 + CF_2=CF_2$, and optionally in the presence of chlorofluoroolefins, by subsequent removal of the peroxidic groups by heat treatment and by following hydrolysis treatment to convert the —COF groups into —COOH groups, consisting of a macromolecule mixture, represented by formula:

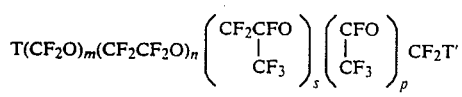

wherein the perfluorooxyalkylene units with indexes m, n, s, p are randomly distributed along the chain, the values of m, n, s, p being such as to have an average molecular weight ranging from 2,500 to 20,000, index n being 0 when only $C_3F_6$ is used as the starting fluorinated olefin, end groups T and T', like or unlike each other, are comprised in the following group: $CF_2XO-$, $C_2F_4XO-$, $C_3F_6XO-$, COOH, optionally salified with an amine or converted into an amidic group,

and its hydroxylated derivative

wherein X is F or Cl, and characterized in that the number ratio existing in the macromolecule mixture between ketonic groups

or hydrates thereof and carboxylic groups —COOH or its salified or amidic derivatives ranges from 0.5 to 5 and that the milliequivalents of end groups —COOH and its salified or amidic derivatives per gram of product ranges from 0.005 to 0.25.

2. A method of using perfluoropolyethers according to claim 1, wherein the carboxylic group is partially or wholly salified with either an excess, if any, of a primary, secondary or tertiary amine or with a heterocyclic base optionally containing, besides N, other heteroatoms.

3. A method of using perfluoropolyethers according to claim 1, wherein the carboxylic group is partially or wholly converted into an amidic group —$CONR_1R_2$, wherein $R_1$ and $R_2$ are H or alkyl, cycloaklyl, alkylaryl, aryl radicals, optionally containing substituents preferably —OH, halogens, or N belongs to a heterocyclic radical which may contain also other heteroatoms.

4. Lubricating oils consisting essentially of perfluoropolyethers having perfluoroalkyl end groups added with the perfluoropolyethers of claim 1.

5. Perfluoropolyethers of claim 2, wherein the heterocyclic base contains, besides N, other heteroatoms.

6. Perfluoropolyethers of claim 5, wherein the other heteroatoms are selected from O, S, and P.

7. Perfluoropolyethers of claim 3, wherein the carboxylic group is converted with an optional excess of amine.

8. Perfluoropolyethers of claim 3, wherein $R_1+R_2$ contain —OH, halogens or N substituents which belong to a heterocyclic radical.

9. Perfluoropolyethers of claim 8, wherein the heterocyclic radical contains other heteroatoms.

10. Perfluoropolyethers of claim 9, wherein the other heteroatoms are selected from O, S and P.

11. Perfluoropolyethers of claim 3, wherein the other heteroatoms are selected form O, S and P.

* * * * *